United States Patent [19]

Fujiwara

[11] Patent Number: 4,508,254

[45] Date of Patent: Apr. 2, 1985

[54] ADHERING GUN FOR FASTENERS

[75] Inventor: Kousyun Fujiwara, Okazaki, Japan

[73] Assignee: Toyota Jidosha Kabushiki Kaisha, Japan

[21] Appl. No.: 454,088

[22] Filed: Dec. 29, 1982

[51] Int. Cl.[3] .......................... B25C 5/02; B27F 7/00; B32B 31/00; B44C 7/00

[52] U.S. Cl. .................................... 227/116; 227/136; 156/541; 156/577; 156/579

[58] Field of Search ............... 227/110, 116, 115, 136, 227/137, 138; 29/423, 424; 206/341, 347; 156/541, 540, 579, 577, 574, 539, 580, 584; 74/53, 54, 55, 89

[56] References Cited

U.S. PATENT DOCUMENTS

| | | | |
|---|---|---|---|
| 3,666,155 | 5/1972 | Saluzzi | 227/116 |
| 3,688,966 | 9/1972 | Perkins et al. | 227/136 |
| 3,732,741 | 5/1973 | Defontenay et al. | 74/55 |
| 4,037,771 | 7/1977 | Peterson | 227/136 |
| 4,289,040 | 9/1981 | Haluko, Jr. | 74/55 |
| 4,319,705 | 3/1982 | Geist et al. | 227/136 |

*Primary Examiner*—Edward Kimlin
*Assistant Examiner*—L. Falasco
*Attorney, Agent, or Firm*—Finnegan, Henderson, Farabow, Garrett & Dunner

[57] ABSTRACT

A gun for successive adhesion of fasteners, comprising a body, a slide which is slidably fitted in the body, an actuator of the slide having an operating trigger, a fastener loading station on the body, a fastener preadhering station located below the fastener loading station and in front of the slide, a shutter plate for bringing fasteners on the fastener loading station into the fastener preadhering station one by one, and a fastener exiting station in front of the fastener preadhering station, the slide being moved to push out the fasteners located at the fastener preadhering station from the gun.

10 Claims, 6 Drawing Figures

ADHERING GUN FOR FASTENERS

BACKGROUND OF THE INVENTION

This invention relates to a gun for successively adhering pieces of adhesive-backed flat bands known generally as "fasteners".

Fasteners are used, for example, to secure decorative molding to automobile bodies. For example, fasteners are first adhered to the inner periphery of a window frame of an automobile, then window molding is fitted in and secured to the fasteners.

In the past, workers have had to peel off the fasteners one by one from a mother paper on which a large number of fasteners are provisionally adhered, provisionally apply the fasteners to the inner periphery of the window frame, then firmly adhere the fasteners thereto by the use of a hand roller. Namely, workers have had to engage in primitive, manual operations consuming considerable time and labor. Furthermore, the manual nature of the work results in non-uniform pressing force applied to the fasteners, resulting in non-uniform adherence of the fasteners to the inner periphery of the window frame, presenting an unsightly appearance.

SUMMARY OF THE INVENTION

The primary object of the present invention is therefore to provide a simple fastener adhering gun which can substantially automatically effect successive feed, application, and adhesion of the fasteners.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

According to the invention, there is provided a gun for successive adhesion of adhesive-backed fasteners, comprising a body having a handle, a slide which is slidably fitted in the body, an actuator for the slide movement of the slide having an operating trigger, a fastener loading station on the body, a fastener preadhering station below the fastener loading station and in front of the slide for provisionally positioning fasteners, feeding means for bringing fasteners to be loaded on the fastener loading station into the fastener preadhering station one by one, and a fastener exiting station adjacent to the fastener preadhering station, the slide being moved to push out the fasteners located at the fastener preahering station from the gun through the fastener exiting station.

The accompanying drawings, which are incorporated in and constitute a part of this specification, illustrate one embodiment of the invention and, together with the description, serve to explain the principles of the invention.

BRIEF DESCRIPTION OF THE DRAWINGS

In the drawings, which show preferred embodiments of the present invention.

DESCRIPTION OF THE PREFERRED EMBODIMENTS

Reference will now be made in detail to the present preferred embodiment of the invention, an example of which is illustrated in the accompanying drawings.

Figure 1:
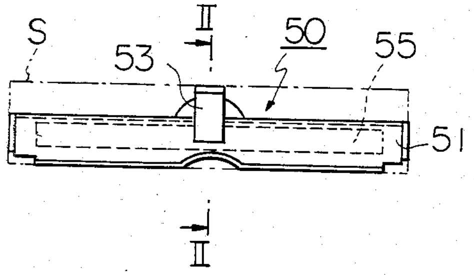
Fig. 1 PRIOR ART
FIG. 1 is a front elevational view of an example of a conventional fastener used in the present invention.
Figure 2:
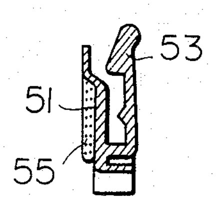
Fig. 2 PRIOR ART
FIG. 2 is a sectional view taken along the line II—II in FIG. 1.

FIGS. 1 and 2 show an example of a fastener 50 used in the present invention. The fastener 50 comprises an elongated band-like plastic body 51 provided with an adhesive backing 55. The body 51 has a tongue 53 on the side opposite to the backing 55. A decorative window molding (not shown) can be fitted in the space defined between the body 51 and the tongue 53. The adhesive backing 55 is used to adhere the fastener 50 to a mating member such as a window frame.

Figure 3:
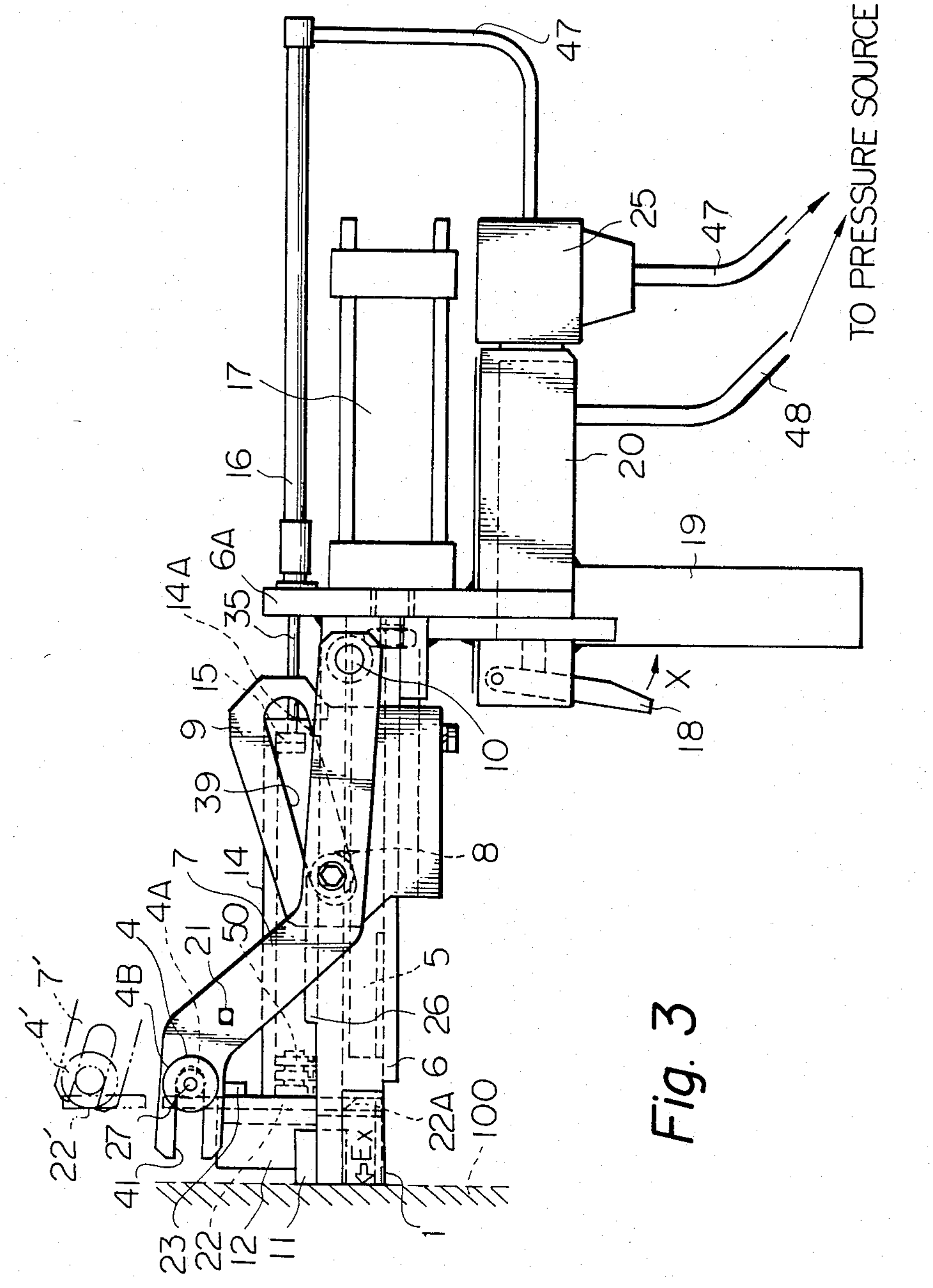
FIG. 3 is a side elevational view of an adhering gun according to the present invention.
Figure 4:
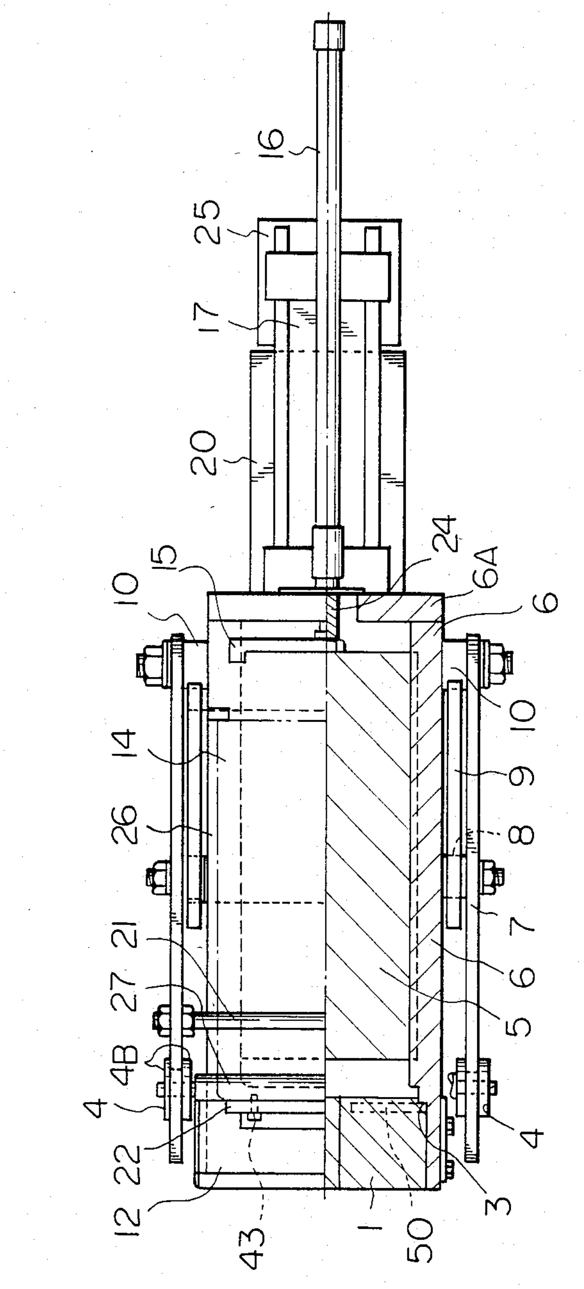
FIG. 4 is a partially sectional plan view of FIG. 3.
Figure 5:
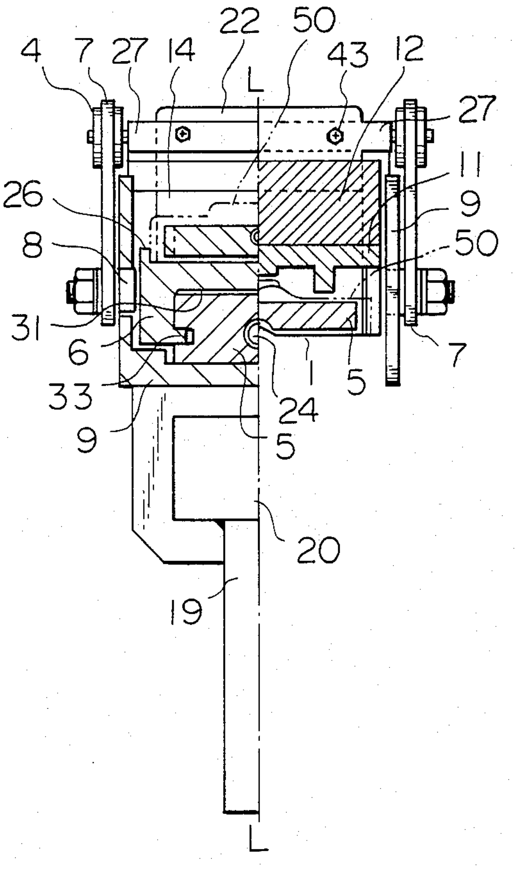
FIG. 5 is a longitudinal sectional view of FIG. 3, in which the right half is viewed from the front and the left half from behind.

FIGS. 3 to 5 show an embodiment of the adhering gun according to the present invention. The adhering gun comprises an elongated plate body 6 which has a handle 19. The body 6 has a lower channel 31 in which a slide 5 is slidably fitted. The body 6 has projections 33 on its opposite sides which serve as guide rails of the slide 5, so that the slide 5 can slide along the projections 33 without coming out from channel 33. The adhering gun is symmetrical with respect to a vertical center line L-L (FIG. 5). The body 6 also has upper projections 26 on its opposite sides, which serve as supporting walls for a cassette 14 of the fastener 50. The projections 26 provide a loading station for the cassette.

The fasteners 50 are located side by side in the removable cassette (fastener magazine) 14 in standing state as shown in FIG. 2 and can be removed from the gun with the cassette 14. The fasteners 50 move in the cassette 14 while being guided by the projections 26. The cassette 14 is, for example, in the form of a rectangular box which has a hollow space corresponding to an imaginary rectangule S (FIG. 1) defined by the outermost sides of the fasteners. The cassette 14 has a open front end which enable the fasteners to come out from the cassette 14. The cassette 14 also has an open rear end through which a piston rod 35 extends into the cassette 14. The cassette 14 has a projection 14A at its rear end to prevent the fasteners from accidentally coming out from the cassette through the rear end. The piston rod 35 has at its front end a pusher 15 which bears against an rearmost fastener 50 located in the cassette 14. The piston rod 35 is connected to a miniature cylinder 16 attached to an upright wall portion 6A, which is an integral part of the body 6, so that the pusher 15 can move forward (and backward) in the cassette to push out the fasteners one by one. The cylinder is preferably a pneumatic cylinder but may be a hydraulic cylinder. A frontmost fastener 50 is pressed against a stop 12, explained hereinafter, to prevent the fasteners 50 from unnecessarily coming out of the cassette 14.

The slide 5 is connected to a piston rod 24 of a main (hydraulic or pneumatic) cylinder 17 attached to the portion 6A of the body 6 so that the slide 5 can move in the channel 31 of the body 6. The main cylinder 17 is preferably a double-acting air cylinder which has a two-position valve 20 for switching a pneumatic pressure circuit between a first position at which the piston rod 24 moves forward and a second position at which the piston rod 24 moves backward. The valve 20 can be, for example, a known spool valve actuated by a spool or lever 18. The cylinders 16 and 17 can be replaced by another actuator such as a motor-driven ball-screw mechanism. The working pressure of the cylinder 16 is controlled by a known pressure regulator 25, so that the pusher 15 can continuously press the frontmost fastener 50 against the stop 12 at a constant pressure. The cylinder 16 is connected to a pressure source, such as an air pump, by means of a hose 47, through the pressure regulator 25. The cylinder 17 is connected to the same or separate pressure source, by means of a hose 48, through the valve 20.

The slide 5 has on its opposite sides cam plates 9 which are of substantially L-shaped when viewed from behind or the front and which are secured to the bottom of the slide 5. Each of the cam plates 9 has, on its upright side wall, an inclined elongated hole 39 which receives therein a corresponding roller 8 which is rotatably supported by an associated link arm 7 which is in turn rotatably pivoted to the body 6 at a pivot pin 10. The link arms 7 on the opposite sides of the body 6 rotate about the pivot pin 10 when the associated cam plates 9 move forward and backward together with the slide 5, with the rollers 8 rolling in and along the inclined elongated holes 39. That is, when the cam plates 9 move in the right-hand direction (backward movement) in FIG. 3 with the slide 5, the link arms 7 rotate in the clockwise direction at the pivot pins 10 and vice versa.

At the front ends of the link arms 7 are formed U-shaped grooves 41 which receive therein rollers 4 which have an H-sectional shape. The rollers 4 are rotatably supported by and on opposite ends of a roller shaft 27 rigidly connected to a shutter plate 22, by means of bolts 43. The shutter plate 22 is adapted to separate the frontmost fastener 50 from other fasteners 50. Each of the rollers 4 has opposite disc-shaped flanges 4B and an intermediate roller shaft 4A which extends between the two flanges 4B and which has a smaller diameter than that of the flanges 4B. The roller shafts 4A of the rollers 4 are rotatably fitted in the corresponding U-shaped grooves 41 so that the flanges 4B prevent the rollers 4 from being displaced in the axial directions of the rollers 4. The rollers 4 can move in the U-shaped grooves 41 in lateral directions perpendicular to the axis of the rollers 4.

The shutter plate 22 has, at its lower end, an edge 22A which is adapted to separate the frontmost fastener 50 when stuck to another fasteners 50. The stop 12 is located on and secured to the front end of the body 6, so that the frontmost fastener 50 is pressed against the stop 12, as mentioned before. The stop 12 has a guide wall 23 defining the passage for the shutter plate 22, so that the shutter plate 22 can move up and down guided beween the stop 12 and the guide wall 23.

It should be noted that if the shutter plate 22 is integrally connected to the front ends of the link arms, the shutter plate 22 could not move up and down in one vertical plane, since the front ends of the link arms 7 move along archwise loci having a center at the respective pivot pins 10 when the link arms 7 rotate about the pivot pins 10. However, since the shutter plate 22 is rigidly connected to the roller shaft 27 of the rollers 4, which can roll in the U-shaped grooves 41 of the link arm 7, the shutter plate 22 can move up and down in the same one vertical plane in which the shutter plate 22 lies while causing relative movement between the rollers 4 and the link arms 7, i.e., the grooves 41 of the link arms. That is, when the link arms 7 come to their uppermost position 7′, the rollers are located at a position 4′ adjacent to the front ends (outer ends) of the grooves 41, and, accordingly, the shutter plate 22 is located at a position 22′ directly and vertically above the frontmost fastener 50. The position 22′ is vertically in alignment with the shutter plate 22. Thus, the shutter plate 22 always moves in the vertical passage defined by the stop 12 and the guide wall 23.

Only the frontmost fastener 50 comes out of the front end of the cassette 14.

On the lower portion of the body 6 in front of the slide 5 are provided fastener guide projections or shoulder portions 3 which are adapted to provisionally position therein or therebetween the fastener 50 brought to a preadhering position by the downward movement of the shutter plate 22. The preadhering position is directly and vertically below the frontmost fastener 50 bearing against the stop 12. The projections 3 provide a fastener preadhering station. A dish-like fastener receiving plate 1 is provided in front of and below the projections 3. A plate 11 is provided on the body 6 and is located above the fastener receiving plate 1 so as to form an upper guide for the fastener 50 located at the preadhering position. The fastener 50 can move between the plates 1 and 11 to an exit shown by an arrow Ex in FIG. 3, while keeping its upright state. In will be appreciated that a stabilizer rod 21 is provided for connecting the opposite link arms 7 in order to ensure the link arms 7 can stably, equally, and simultaneously rotate about the respective pivot pins 10 without being eccentric to each other.

The adhering gun of the present invention operates as follows. When the lever 18 is released to bring the main cylinder 17 to the second position in which the piston rod 24 is retracted, the slide 5 connected to the piston rod 24 moves backward in the channel 31 of the body 6 (in the right-hand direction in FIG. 1), so that the link arms located at the uppermost position 7′ move downward, i.e., rotate in the counterclockwise direction about the respective pivot pins 10. The downward movement of the link arms 7 causes the shutter plate 22, which is movably connected to the front ends of the link arms by means of the rollers 4, to move vertically downward, while being guided by the stop 12 and the guide wall 23. When the shutter plate 22 moves downward, the frontmost fastener 50 is first separated from the remaining fasteners 50 by means of the edge 22A and is then pushed down, so that it comes in the guide projections 3 and on the fastener receiving plate 1. That is, the fastener 50 is brought to the preadhering position or station.

After that, the lever 18 is actuated or pulled like a gun trigger in the direction X (FIG. 3) by the worker, holding the gun by the handle 19, to shift the valve 20 to the first position in which the piston rod 24 of the main cylinder 17 is moved forward, i.e., in the left-hand direction in FIG. 3. The forward movement of the piston rod 24 causes the slide 5 to move in the same direction together with the cam plates 9. When the cam plates 9 move forward, the associated link arms 7 rotate in the clockwise direction about the respective pivot pins 10 by means of the engagement of the rollers 8 in the inclined elongated holes 39, so that the shutter plate 22 moves upward in the vertical direction. Consequently, the shutter plate 22 is returned to its initial position 22′, so that the fastener 50 remains in the guide projections 3. As soon as the shutter plate 22 comes above the cassette 14 in the course of its return movement, the frontmost fastener 50 located in the cassette 14 moves forward by one pitch, corresponding to one fastener width, by means of the pusher 15, so that the frontmost fastener 50 comes to bear against the stop 12. During the forward movement of the slide 5, the front end thereof comes into contact with the fastener 50 located in the guide projections 3 and on the fastener receiving plate 1 and then pushes out the fastener 50 therefrom. During this movement of the fastener 50, the upright posture thereof can be kept by the fastener receiving plate 1 and the upper plate 11. The fastener 50 located at the preadhering position can be thus pushed out from the exit Ex in FIG. 3 (fastener exiting station). At the exit, a window frame 100 or other mating material to which the fasteners are to be adhered is located. The fasteners pushed out from the adhering gun can be adhered to the window frame 100 by means of the adhesive backing 55 of the fasteners 50, the fasteners being located side by side in the cassette 14 with the adhesive backing 55 facing the stop 12. By repeated actuation of the lever 18, a large number of fasteners 50 can be succcesssively adhered to the window frame 100 at a constant pressure.

Figure 6:
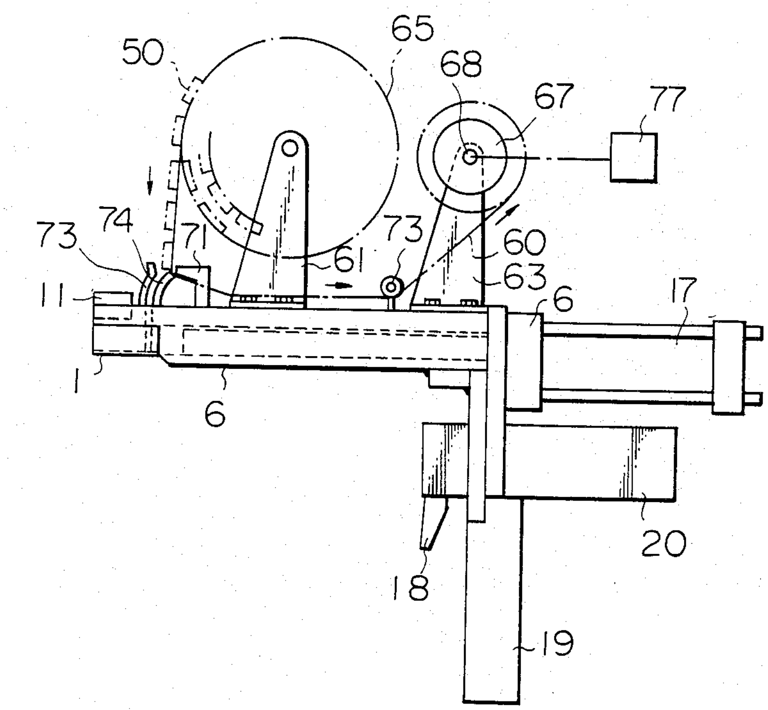
FIG. 6 is a side elevational view of a main part of another embodiment of an adhering gun according to the present invention.

FIG. 6 shows a modification of an arrangement illustrated in FIG. 3. In FIG. 6, the feed of the fasteners 50 can be effected by a drum mechanism in place of the cam mechanism used in the first embodiment. The following description is mainly directed to differences between the first embodiment and the modified embodiment. In FIG. 6, the body 6 is provided with supporting brackets 61 and 63 which rotatably support a fastener feeding roll 65 and a paper winding drum 67, respectively. The fastener feeding roll 65 is made of rolled mother paper 60 having thereon a large number of fasteners 50 provisionally adhered thereto at predetermined intervals. The mother paper 60 is wound by the winding drum 67 after the fasteners 50 are separated. The winding drum 67 is continuously subjected to a rotational force in the winding direction by means of an air motor 77 which is operatively linked to a rotatable shaft 68 of the winding drum 67 and which is connected to and driven by, for example, the pressure source for the cylinder 17. The rotational force continuously applied to the rotatable shaft 68 results in continuous tension on the motor paper 60 in the winding direction shown by arrows in FIG. 6. The passage of the mother paper 60 can be properly defined by a guide 71 and an idle roller 73 provided on the body 6. The guide 71 is also adapted to change the direction of movement of the mother paper 60, for example, through approximately 90°, so that the fasteners 50 can be easily peeled off or separated at the guide 71. The fasteners 50 thus separated freely fall along and between guide walls 73 and 74 which are located directly above the aforementioned preadhering position, so that the fasteners 50 come to the preadhering position in which the fasteners are located in or between the guide projections 3 (FIG. 4) and on the fastener receiving plate 1. The subsequent operations for pushing out the fasteners located at the preadhering position from the exit Ex (FIG. 3) to adhere them, for example, to the window frame 100 (FIG. 3) by use of the slide 5 (FIG. 3) are quite the same as those of the first embodiment shown in FIGS. 3 to 5. It can be easily understood that the shutter plate 22, the pusher 15, and the elements associated with the pusher, such as the actuating cylinder 16 and the pressure regulator 25, can be all dispensed with, in the arrangement illustrated in FIG. 6. This decreased number of parts or components of the adhering gun contributes to decreased misoperation or trouble of the gun.

The parts or components of the adhering gun according to the invention are preferably made as much as possible of light resinous materials, such as plastic, to make the gun lighter.

As can be seen from the above discussion, according to the present invention, the fasteners can be easily charged in the adhering gun by use of a cassette, which stores therein a large number of fasteners. Further the fasteners can be simply and successively fed and adhered merely by actuating the gun trigger-like lever. Thus, not only can time and labor for the adhering operation be largely decreased, but also no skilled worker is required for the operation.

It is possible to combine the adhering gun of the invention with a general-purpose robot in order to provide a completely automatic adhering gun machine. In such a case, the robot can be small, because the adhering gun of the invention is small, simple, and light.

While this invention has been described basically in reference to adhering the fasteners onto the inner periphery of a window of an automobile, the application of the invention is not limited thereto.

I claim:

1. A fastener gun for successive adhesion of adhesive-backed fasteners, comprising a body having a handle, a slide adapted for slide movement fitting slidably in the body, an actuator for effecting the slide movement of the slide, said actuator having an operating trigger, a fastener loading station having link arms rotatably pivoted to said body, a fastener preadhering station mounted below the fastener loading station and in front of the slide for positioning fasteners such that the actuator pushes said slide against said fasteners, means for feeding fasteners loaded in the fastener loading station into the fastener preadhering station one by one, a fastener exiting station mounted adjacent to the fastener preadhering station at a location such that when said slide pushes fasteners located at the fastener preadhering station from the gun, said fasteners leave through the fastener exiting station, means for transmitting the movement of said slide to the fastener feeding means, said transmitting means including cam plates connected to said slide so as to move therewith, said fastener loading station link arms being pivotably moved along said cam plates, and a separator connected to said link arms to move with the pivotable movement of the link arms, said separator separating the fasteners from one another and for carrying the separated fasteners to the fastener preadhering station when said slide is moved to a position opposite to the fastener exiting station.

2. The gun according to claim 1, wherein said fastener loading station comprises supporting means on the body for supporting a removable cassette which stores therein a number of fasteners arranged side by side and provisionally adhered to each other.

3. The fastener gun according to claim 1, wherein said cam plates have inclined elongated holes and wherein said link arms have rollers rotatably fitted into corresponding inclined elongated holes of the cam plates.

4. The fastener gun according to claim 1, wherein said link arms are provided on opposite sides of the body and are interconnected by means of a stabilizer shaft.

5. The gun according to claim 1, wherein said actuator comprises a double acting cylinder actuated by the operating trigger.

6. The fastener gun according to claim 1, further comprising a cassette for carrying fasteners, biasing means for continuously pressing the fasteners in the cassette in one direction, and a stop located in front of the cassette, a frontmost fastener being pressed against the stop.

7. The gun according to claim 6, wherein said separator comprises a shutter plate which is movably connected to the link arms to bring the frontmost fastener bearing against the stop into the fastener preadhering station.

8. The gun according to claim 7, further comprising means for converting the rotational movement of the link arms to linear movement of the shutter in one plane.

9. The gun according to claim 8, wherein said converting means comprises grooves provided in the link arms and rollers which are connected to the shutter plate and which can roll in the associated grooves.

10. The fastener gun according to claim 1, wherein said separator comprises an edge for separating fasteners which are adhered to each other.

* * * * *